Patented Sept. 24, 1929

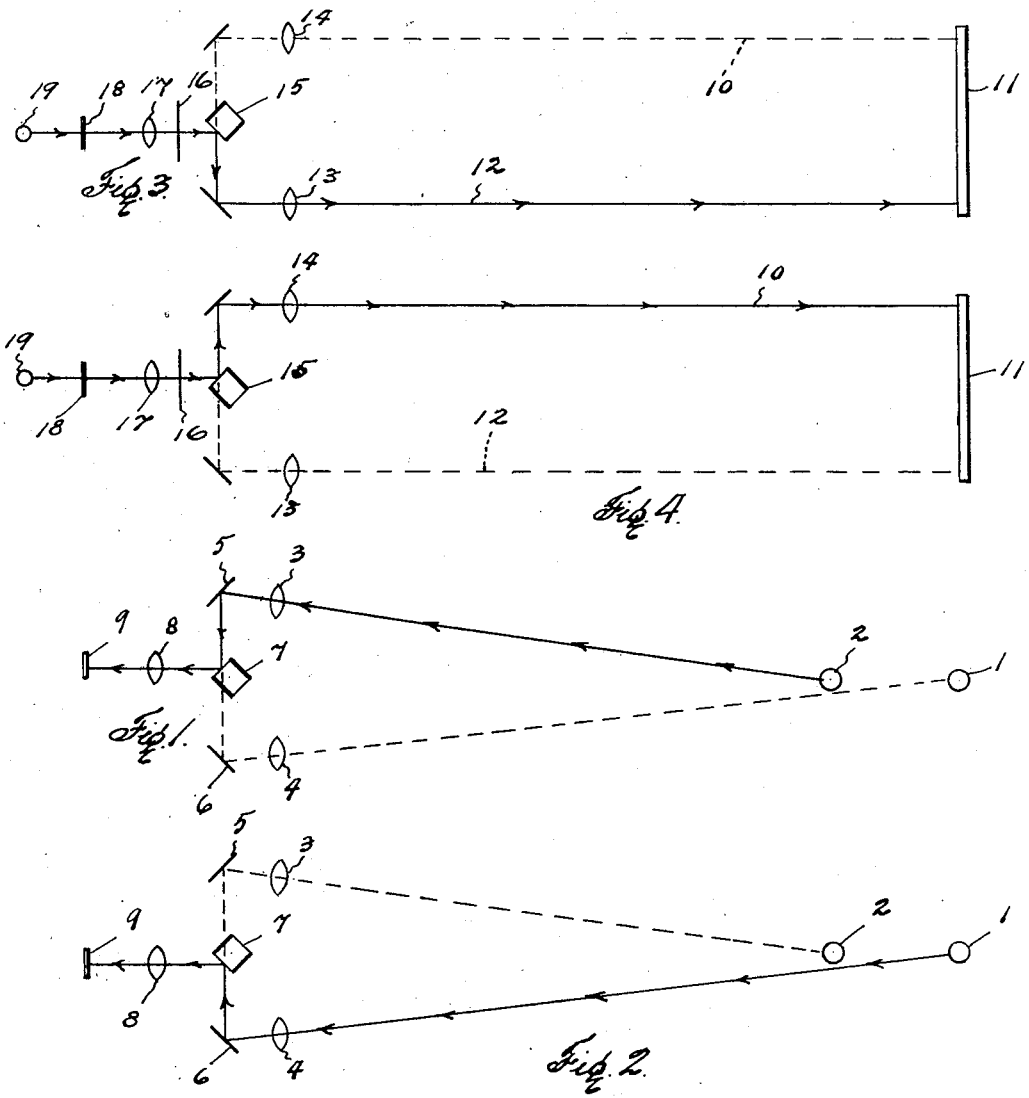

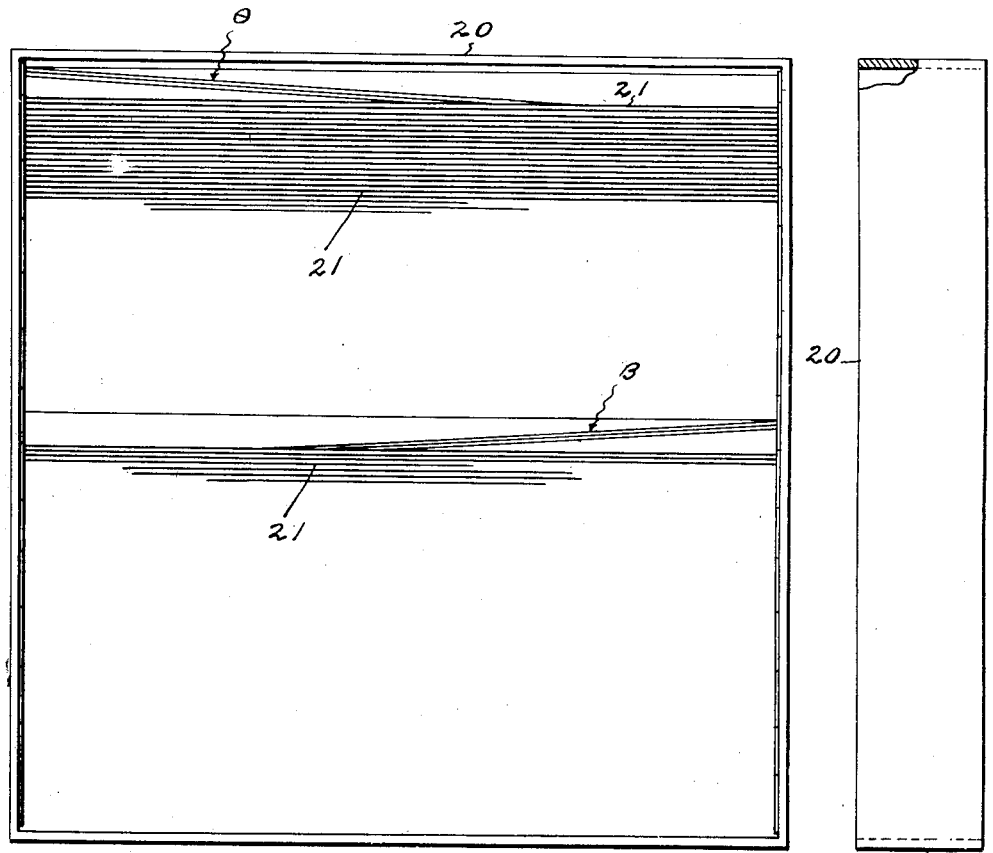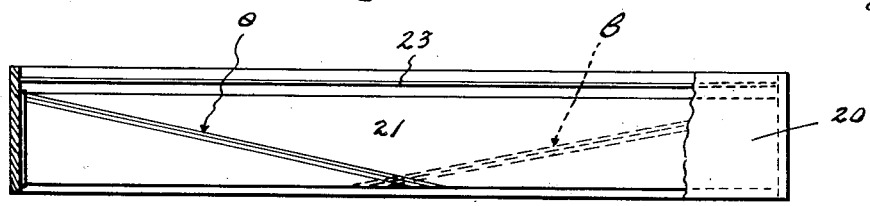

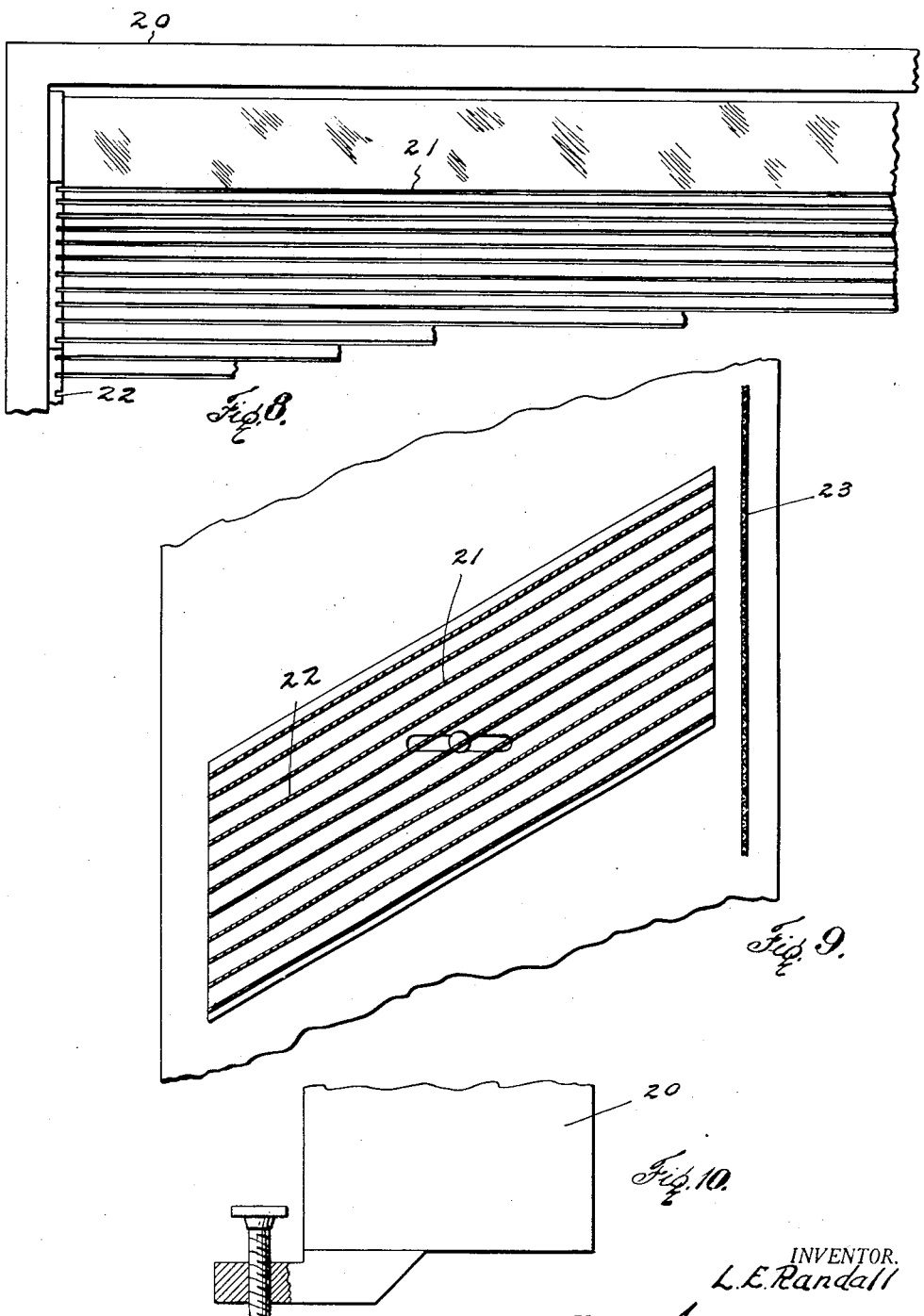

1,729,520

UNITED STATES PATENT OFFICE

LA BAUME ELLIOTT RANDALL, OF DALLAS, TEXAS, ASSIGNOR OF ONE-HALF TO ASSOCIATED FACTORIES CORPORATION, OF DALLAS, TEXAS, A CORPORATION OF DELAWARE

METHOD AND APPARATUS FOR PRODUCING PICTURES HAVING RELIEF EFFECTS

Application filed January 4, 1929. Serial No. 330,340.

The invention relates to an improved method and apparatus for producing pictures which present to the eyes of an observer an effect of relief or depth, the pictures standing out in lifelike manner.

In carrying out the invention, alternate exposures of a sensitized continuous strip of film are made through a system of lenses and mirrors and their mechanical attachments in such procedure that first one exposure is made from the right and then the next consecutive exposure is made from the left. This is brought about by the following means and manner:

The light reflected from the object passes to an oblique mirror, so adjusted that rays are focused on an apparatus at the center of the line of focus of the camera, which in turn directs the rays into the camera and onto the film. This apparatus at the center of the line of focus of the camera may consist either of mirrors or of prisms so manipulated that at the moment one segment of the film is directly in position for exposure, the mirrors or prisms are exactly in position for projecting the rays from the object exposed, first from the left oblique mirror along the line of focus of the camera and then at the moment the next segment of film is in position for exposure, the rays from the same object exposed are directed from the right oblique mirror along the line of focus of the camera.

In projecting the pictures taken to produce a three-dimensional or relief effect, which effect may be obtained without the use of special glasses or synchronized shutters by the individual viewing them there is provided a screen, more specifically and hereinafter described for the purpose of illustration, although the specific details of the screen are not claimed in the present application, and other forms of screen may be employed without departing from the spirit of the invention.

The screen is used in connection with a projection apparatus which will project from the left at one moment, one picture taken from an angle at the left and focused on the face of the screen, and at the next moment there is another picture, exposed from the opposite angle at the right and projected from the right and focused on the back of the screen. Now the rays so projected are reflected to my screen, wherein there are planes normal to the rays from the left and also there are planes normal to the rays projected from the right. These planes are so made that the light which is projected from the right is visible only on right normal planes. Also the light projected from the left is visible only on left normal planes, or vice versa.

In the drawings hereunto annexed and forming part of this specification:

Figures 1 and 2 are diagrammatical illustrations of a camera lens, oblique mirrors and rotating mirror, showing their relative positions in operation, Figures 3 and 4 are diagrammatical illustrations of the ray system projection apparatus relative to the screen, Figure 5 is a front elevational view of a screen upon which the pictures are projected, Figure 6 being a top view and Figure 7 a side view, respectively, Figure 8 is an enlarged fragmentary front view of the screen, showing the construction of the planes, Figure 9 being a partial vertical sectional view, Figure 10 represents a fragmentary view of the base of the screen.

Proceeding in accordance with the drawings and wherein numerals are employed to designate the various parts, and referring to Figures 1 to 4 inclusive:

1 indicates a distant object in the background, 2 an object in the foreground, the lens 3 being focused on near object 2, and 4 shows the lens focused on the distant object 1. 5 and 6 are left and right oblique mirrors. A rotating mirror system is indicated at 7 at the focal axis of the camera lens 8. The rotating mirror system consists of two mirrors on opposite sides of a square and the sides between the mirrors are flat black planes. 9 indicates the approximate location of film, the latter being a continuous strip single film. In Figures 3 and 4 lenses indicated by 17 and 13 are made of quartz whereas the lens 14 is made of glass. In Figures 3 and 4, 10 indicates a ray focused on the back of the screen 11, while 12 shows the ray focused on the front louvers of the screen 11. The right and left lenses of the alternating apparatus of the projection system are denoted at 13 and 14. 15 indicates a rotating mirror or prism mechanism exactly similar to 7 in the photographing system, and 16 denotes the shutter of the projection machine. 17 is the lens system of the projection machine proper, 18 is the printed film, and 19 is the special light source of the projection machine.

20 indicates a screen frame. 21 indicates a front view of a single supporting louver.

The supporting planes or louvers 21 are made preferably of a transparent material in sheets of such thickness that there is sufficient strength for holding the indented lines but at the same time thin enough that the transparency is not appreciably decreased to both a white light and actinic light. These louvers 21 are supported in parallel slots 22 disposed at an angle alpha in the sides of a frame. In Figure 5 is shown the indented lines drawn on the supporting planes. Each alternate louver has a series of these indented lines drawn on its surface parallel to each other, completely across the supporting louver and at an angle to the screen face. Intermediate louvers are preferably provided with parallel lines drawn in the opposite direction, but with equal angles to the lines on the first set of louvers. Those supporting louvers having parallel lines drawn from points at the rear and at the left to points at the front and at the right making an angle with the screen face indicated by theta are alternate with supporting louvers that are parallel and have lines drawn on their surfaces from points at the rear and at the right to points at the front and at the left making an angle with the screen face indicated by beta. The lines drawn at the angles theta and beta, one at the left the other at the right successively, develop a series of vertical planes parallel to each other which are normal to the focal axis to the left projecting lenses of the projecting machine and normal to the focal axis of the right lens of the projecting machine.

It must be clearly understood here that these vertical parallel planes cross each other at all points in the screen since they are developed on the supporting louver as merely lines and that the thickness of the screen is such that the gross width of all indented lines drawn through the width of the supporting louvers is such that it exactly equals the supporting louvers projection upon the plane of the face of the screen. Consequently the apparent total area of the face of the screen is completely filled with reflecting points. A solid screen is shown at 23 covered with the regular screen material and impregnated uniformly over a surface with the chemicals having a fluorescent effect and capable of transforming actinic light used on the supporting louvers. This screen 23 is at the back of the main screen frame and placed perpendicular to the axis of the regular projection apparatus.

In practice the screen may be constructed with louvers or shelves of any transparent material such as celophane or zylite, the louvers being set in the frame at an angle of approximately forty-five degrees to horizontal, with a space of approximately one quarter of an inch between louvers. The diagonal lines on the louvers are approximately one sixteenth of an inch apart, and cover practically the entire surface of each shelf, the diagonals running in opposite directions on alternate shelves or louvers. The lines on every other shelf may be filled with powdered aluminum and the lines in the remaining shelves or louvers are filled with a chemical which glows in actinic light. Chemical mixtures of calcium sulphides have been used for this purpose, also anthracene trated with ortho quinone or other equivalent chemicoluminescent materials.

The main screen here shown is of a type designed to give a stereoscopic effect within an angle of front vision approximately 20 or 30 degrees with the normal. The complete screen can be visualized as a system of parallel curved surfaces which would appear as a section or as a square segment cut from a surface of an ellipsoidal spheroid.

The complete process from taking the picture to projecting the picture would be as follows: The camera lens will first be focused to the right on the background and middle foreground and the left lens focused on the foreground objects or vice versa. Then the picture will be taken as usual with a continuous strip of film, the rotating mirror being synchronized with the camera shutter so that first one picture is taken from the left and the next one is taken from the right and so on successively or vice versa.

Now in projection on the screen a similar apparatus is placed on the front of the regular projection machine. The picture which has been photographed from the right, if taken focused on the background and middle foreground, is started in the machine in its correct sequence so that the right lens of the projection machine will be focused on the rear of the screen and successively the left picture will be focused on the face of the screen. The projection machine shutter is synchronized with the rotating mirror which alternates the projected rays from the right to the left and from the left to the right successively. The film must be started in its correct sequence relative to the screen and to the manner in which the film was photographed, that is, if the right lens of the camera was focused on the background and the left lens on the foreground, then necessarily the projection machine lenses must be focused to the right on the rear of the screen and the left on the face of the screen. The light source of the projection machine is of a different character from that ordinarily used, the light source here used is rich in actinic light, but at the same time of sufficient intensity for good projection. Referring to Figures 3 and 4 it will be noticed that and as hereinbefore pointed out lenses 17 and 13 are made of quartz whereas 14 is of glass, 17 and 13 allow the actinic light to pass and act on the fluorescent chemicals in the rear portions of the screen, whereas 14 does not allow the actinic light to pass and only throws the image on the face of the screen. It should be understood here that whichever series of planes is used for reception of the background objects, that series is impregnated with fluorescent chemicals, whereas the planes used for reception of the foreground objects are not impregnated with such chemicals.

It should be also understood clearly here that the light from the projecting screen may be projected through a single film and from a single source of light, but after changing angle of projection the light passes through selective filters which prevent light which would activate the chemicals of the right planes from passing the left lens and vice versa.

While the foregoing description together with the drawings disclose a complete and practical working embodiment of the principle involved in the invention, it is to be understood, of course, that various alterations are capable of being made, consistent with and within the scope and meaning of the appended claims.

What is claimed as new is:

1. A system for producing relief effects comprising in combination, a projector having a source of light rich in actinic rays, a film having right and left pictures, a plurality of selective filters, one filter permitting the passage of actinic light and the other preventing the passage of such light, means for alternately projecting the light after passing through the film onto one or the other of said filters, and a fluorescent screen having reflective properties for receiving the light from said filters and directing it to the eyes of an observer.

2. In a system for producing relief illusion, in combination, a projection device producing light rich in actinic and visible rays, a series of right and a series of left images, means for directing the light through the images, means for filtering the visible light from one of the series of images, and a reflective screen having fluorescent properties for receiving all of the images.

3. A method of producing pictures having relief illusion, comprising forming right and left images with actinic and visible rays of light, with sufficient rapidity to produce persistence of vision, filtering the actinic light from one of the images, directing the images on a screen, transforming the invisible actinic images on the screen into visible images, and directing the transformed image to one eye of the observer and the reflected image to the other eye of the observer.

In testimony whereof I affix my signature.

LA BAUME ELLIOTT RANDALL.